United States Patent

Huang

[11] Patent Number: 5,940,535
[45] Date of Patent: Aug. 17, 1999

[54] METHOD AND APPARATUS FOR DESIGNING A HIGHLY RELIABLE PATTERN RECOGNITION SYSTEM

[75] Inventor: Yea-Shuan Huang, Hsinchu, Taiwan

[73] Assignee: Industrial Technology Research Institute, Taiwan

[21] Appl. No.: 08/741,740

[22] Filed: Oct. 31, 1996

[51] Int. Cl.[6] ........................................ G06K 9/46
[52] U.S. Cl. .................... 382/201; 382/179; 382/181; 382/182; 382/190; 382/192; 382/199; 382/200; 382/224; 382/259
[58] Field of Search .................... 382/201, 224, 382/259, 181, 182, 190, 192, 199, 200, 179

[56] References Cited

U.S. PATENT DOCUMENTS

| | | | |
|---|---|---|---|
| 4,989,258 | 1/1991 | Takahashi et al. | 382/37 |
| 5,072,452 | 12/1991 | Brown et al. | 381/43 |
| 5,319,738 | 6/1994 | Shima et al. | 395/24 |
| 5,361,379 | 11/1994 | White | 382/36 |
| 5,392,363 | 2/1995 | Fujisaki et al. | 382/13 |
| 5,555,317 | 9/1996 | Anderson | 382/159 |
| 5,572,604 | 11/1996 | Simand | 382/224 |

*Primary Examiner*—Leo H. Boudreau
*Assistant Examiner*—Kanji Patel
*Attorney, Agent, or Firm*—Proskauer Rose LLP

[57] ABSTRACT

A design for a high reliability recognition system utilizes two optimized thresholds for each class k of a prototype data base. One threshold is a class region threshold $CR_k$ and the other is a dis-ambiguity threshold $DA_k$. $CR_k$ specifies a constrained region belonging to a class k, and $DA_k$ corresponds to a value with which a sample belonging to class k can be correctly recognized with a high level of confidence. During recognition, if the distance $D(x, r_M)$ between an input sample x and the representative prototype $r_M$ of a nearest class M is larger than the class region threshold $CR_M$, x will be rejected. Furthermore, if the distance $D(x, r_M)$ is subtracted from the distance $D(x, r_S)$ between x and the representative prototype $r_S$ of a second nearest class S, the resulting distance difference must be greater than the dis-ambiguity threshold $DA_M$, or x will be rejected. An inventive algorithm is used to compute optimum thresholds $CR_k$ and $DA_k$ for each class k. The algorithm is based on minimizing a cost function of a recognition error analysis. Experiments were performed to verify the feasibility and effectiveness of the inventive method.

9 Claims, 12 Drawing Sheets

METHOD AND APPARATUS FOR DESIGNING A HIGHLY RELIABLE PATTERN RECOGNITION SYSTEM

RELATED APPLICATIONS

The subject matter of the present application is related to the subject matter of U.S. patent application Ser. No. 08/313,686, entitled "System and Method for Unconstrained On-Line Alpha-Numeric Handwriting Recognition," filed Sep. 27, 1994 for Lo-Ting Tu, and to the subject matter of U.S. patent application Ser. No. 08/497,030, entitled "System and Process for Constructing Optimized Prototypes for Pattern Recognition Using Competitive Classification Learning", filed Jun. 30, 1995 for Yea-Shuan Huang. Both this application and the above-noted applications are assigned to the same assignee. The contents of the above-noted applications are incorporated herein by reference.

FIELD OF THE INVENTION

The present invention relates to a method for recognizing inputted handwritten or printed characters by comparison to prototype character data precompiled and maintained in a database. In particular, the present invention relates to a strategy for obtaining highly reliable recognition of the inputted data to be recognized.

BACKGROUND OF THE INVENTION

Character recognition is often used in the course of inputting information which is in a humanly readably form (i.e., machine printed or handwritten form) rather than in electronic digital form. For instance, while many computers have a keyboard for receiving keypunch input, other computer systems have an optical scanner for receiving documentary input. Yet other computer systems have a pen-like stylus and tablet digitizer for receiving handwritten input. Such handwriting input devices may be provided for a number of reasons. For example, many users are more accustomed to inputting data via handwriting as opposed to keypunch. Additionally, a keyboard requires a large amount of space which cannot be accommodated in a small portable computer such as a personal digital assistant or PDA.

FIG. 1 shows a conventional character recognition system 10. The character recognition system may include a tablet and stylus 18, an optical scanner 16, or both. In the case of the tablet and stylus 18, the user moves the stylus about the tablet surface. The tablet and stylus 18 convert the user's movement of the stylus with respect to the tablet into digital binary data which graphically represents the movement. That is, if the user had used a pen and paper, the movement would have created marks on the paper. The stylus and table 18 produce pixellated images of such marks in the form of digital data.

In the case of an optical scanner 16, sheets, on which handwritten or machine printed characters are previously formed, are fed into the optical scanner 16. The optical scanner 16 generates digital binary data which graphically represent the characters on the sheets.

The stylus and tablet 18 or optical scanner 16 transfer the data to an I/O interface 14. The I/O interface 14, in turn, transfers the data onto a bus 12 of the system 10. The character recognition system 10 also includes a processor or CPU 20, a main memory 22, a disk memory 24 and an audio/video output device 26. Each of the devices 20, 22, 24 and 26 is connected to the bus 12 for purposes of transferring data to, and receiving data from, one of the other devices or the I/O interface 14. The audio/video output device 26 is for conveying information to a user in the form of images and sounds. To that end, the audio/video output device 26 may include a cathode ray tube or LCD display and loudspeakers. The main memory 22 and disk memory 24 are for storing data and programs. The processor 20 is for processing data. In particular, the processor 20 executes steps in conjunction with the other devices 12, 14, 16, 18, 22, 24 and 26 for recognizing characters from the inputted data.

FIG. 2 illustrates a conventional handwriting recognition process which may be executed by the character recognition system 10 of FIG. 1. In a first step 32, the inputted handwritten or machine printed characters are received. For instance, using the stylus and tablet 18, the user manually writes one or more characters. The stylus and tablet 18 transfer character data which graphically represents the written characters to the I/O interface 14. Alternatively, the user feeds sheets on which handwritten or machine printed characters have been previously handwritten or printed into the optical scanner 16. The optical scanner 16, in turn, transfers character data which graphically represents the handwritten or machine printed characters to the I/O interface 14. The I/O interface 14 transfers the character data via the system bus 12 to, for instance, the main memory 22.

Next in step 34, the processor 20 pre-processes the inputted character data stored in the main memory 22. For instance, the processor 20 may remove noise by discarding clusters of connected filled pixels having less than a minimum threshold area. The processor 20 may also smooth the graphical images of the inputted characters. Next, in step 36, the processor 20 optionally forms a skeleton image of each inputted character and then converts the skeleton images to enlarged contour images (i.e., thickens the lines of the skeleton images). Then, in step 38, the processor 20 segments the images of the characters (i.e., divides the images into sub-images or zones) for purposes of extracting feature values from the character images. Herein, "feature" means any quantifiable graphical characteristic of an image which is useful for distinguishing the image of one or more characters from others. An illustrative segmentation technique is described in U.S. patent application Ser. No. 08/313,686 wherein the segmentation depends on the feature values to be extracted from the inputted characters. For instance, suppose the inputted character is the handwritten number "8". The graphical image of the inputted character "8" may be segmented as shown in FIGS. 3, 4 and 5. In FIG. 3, eight zones 321, 322, 323, 324, 341, 342, 343 and 344 are formed as shown. In FIG. 4, eight zones 352, 354, 356, 358, 372, 374, 376 and 378 are formed as shown. In FIG. 5, four zones 332, 334, 336 and 338 are formed as shown.

Next, in step 40 (FIG. 2), the processor 20 extracts a vector of feature values for each inputted character. U.S. patent application Ser. No. 08/313,686 provides examples of features which may be extracted from characters segmented as shown in FIGS. 3–5. These illustrative features are briefly described below. Illustratively, feature value vectors are extracted for the same features for each character.

Referring to FIG. 6, the extraction of stroke density function (SDF) feature values is illustrated. In evaluating the SDF, the processor 20 projects a number of inspection lines in each zone in which the SDF is evaluated. The processor 20 then counts the number of times the graphical image of the character crosses an inspection line within the zone. The total number of crossings is divided by the total number of inspection lines to produce the result of the SDF function (which, in turn, is the SDF feature value). Illustratively, the processor 20 does not evaluate the SDF in every zone.

Rather, the processor 20 illustratively evaluates the SDF in the eight vertical zones 321, 322, 326, 327, 341, 342, 346 and 347 and in four horizontal zones 332, 334, 336, and 338 to produce 12 feature values.

Referring to FIG. 7, the extraction of peripheral background area (PBA) feature values is described. In determining the PBA, the processor 20 evaluates the following function:

$$PBA = \frac{\sum_{n'=1}^{N'} \lambda'_{n'}}{X'_{m'} \cdot Y'_{m'}} \quad (1)$$

where n' is an index of points on either the horizontal (x') or vertical (y') axis which successively takes on each value from 1 to the maximum dimension N' of the character image rectangle on that axis. $\lambda'_{n'}$ is the distance in pixels from the $n'^{th}$ location to a filled pixel of the character image. As shown in FIG. 7, the processor 20 measures $\lambda'_{n'}$ perpendicularly from the corresponding axis. The variable m' takes on a value which indicates the particular zone for which the PBA function is evaluated. $X'_{m'}$ represents the horizontal width of the $m'^{th}$ zone and $Y'_{m'}$ represents the vertical height of the $m'^{th}$ zone.

The processor 20 evaluates the PBA in the vertical direction for each of the zones 321, 322, 326, 327, 341, 342, 346 and 347. The PBA is evaluated in the horizontal direction for the zones 352, 354, 356, 358, 372, 374, 376 and 378. Thus, 16 feature values are extracted.

Referring to FIG. 8, the extraction of the contour line length (CLL) feature values is described. In determining the CLL feature values, the processor 20 evaluates the following formula:

$$\Delta\lambda'_{n'} = \lambda'_{n'+1} - \lambda'_{n'}$$

$$CLL_1 = \frac{\sum_{n'=1}^{N'} \Delta\lambda'_{n'}}{X'_{m'} + Y'_{m'}}, \quad \text{for each } \Delta\lambda'_{n'} < 0$$

$$CLL_2 = \frac{\sum_{n'=1}^{N'} \Delta\lambda'_{n'}}{X'_{m'} + Y'_{m'}}, \quad \text{for each } \Delta\lambda'_{n'} > 0$$

The variables m', n', $X'_{m'}$, $Y'$, and $\lambda'_{n'}$ are as described above. The processor 20 obtains two CLL feature values, namely $CLL_1$ and $CLL_2$, for both of the vertical and horizontal zones 324, 328, 344 and 348. This produces 16 feature values.

Referring to FIG. 9, gradient feature values are extracted. First, the processor 20 assigns a direction code $Dir_{i',j'}$ to each pixel of the character image in the $i'^{th}$ column and $j'^{th}$ row of the character image. The variables i' and j' are indexes in the horizontal (x') and vertical (y') directions, respectively. The direction code corresponds to a direction that is normal to a tangent line at the pixel. As shown in FIG. 9, there are eight possible direction codes which can be assigned, each corresponding to a 45° angle direction, i.e., 0 for 337.5° to 22.5°, 1 for 22.5° to 67.5°, 2 for 67.5° to 112.5°, 3 for 112.5° to 157.5°, 4 for 157.5° to 202.5°, 5 for 202.5° to 247.5°, 6 for 247.5° to 292.5° and 7 for 292.5° to 337.5°. Thereafter, the processor 20 generates a vector of lengths $Len(Dir_{i',j'})$ in each zone using the following formulas:

$$Len = \sqrt{X'^2 + Y'^2} \quad (3a)$$

$$(Dir_{i',j'} - 1) \cdot \frac{\pi}{8} \leq \tan^{-1}\left(\frac{Y'}{X'}\right) < (Dir_{i',j'} + 1) \cdot \frac{\pi}{8} \quad (3b)$$

$$\sum_{i'=1}^{I'} \sum_{j'=1}^{J'} \frac{Len_{i',j'}(Dir_{i',j'})}{Bdd_{m'}(Dir_{i',j'})} \quad \text{for each } Dir_{i',j'} \quad (3c)$$

where $Bdd_{m'}(Dir_{i',j'})$ represents the boundary width of the $m'^{th}$ zone which direction is normal to $(Dir_{i',j'})$, and wherein X' and Y' are values generated using the following kernels:

| -1 | 0 | 1 |
|----|---|---|
| -1 | * | 1 |
| -1 | 0 | 1 |

X'

| 1 | 1 | 1 |
|---|---|---|
| 0 | * | 0 |
| -1 | -1 | -1 |

Y'  (3d)

The processor 20 applies the kernels to each pixel of the character image prior to determining the length Len in the appropriate direction $Dir_{i',j'}$. The lengths $Len_{i',j'}$ are then combined as per equation (3c) to produce a single value for each of the eight directions $Dir_{i',j'}$. Thus, the processor 20 generates eight gradient feature values for each zone. Illustratively, the gradient feature values are extracted from each of the eight zones 352, 354, 356, 358, 372, 374, 376 and 378 thereby generating sixty-four feature values.

After extracting a feature value vector for an inputted character, the processor 20 executes step 42 (FIG. 2). In step 42, the processor 20 compares the feature value vector of each inputted character to feature value vectors contained in a database of predetermined feature value vectors. Illustratively, this database may be stored in the disk memory 24 or the main memory 22. The database contains at least one predetermined feature value vector for each model character of a set of model characters that can be recognized by the system 10. For instance, suppose the system 10 can recognize the letters of the English alphabet. In such a case, at least one predetermined feature value vector is maintained in the database for each letter of the alphabet. Based on these comparisons, the processor 20 determines the predetermined feature value vector which best matches the feature value vector of the inputted character. In step 44 (FIG. 2), the processor 20 outputs the model character to which the best matching predetermined feature value vector corresponds. For instance, the processor 20 can output the ASCII code of the model character, a predetermined character image of the model character, etc.

Many prior art modifications and enhancements have been proposed for character recognition. See, U.S. Pat. Nos. 5,151,950, 5,050,219, 5,034,989, 4,903,312, 4,731,857, 4,718,103, 4,685,142, 4,284,975, and 4,773,099, and D. Lee & N. Srihari, Handprinted Digital Recognition: A Comparison of Algorithms THIRD INTERNATIONAL WORKSHOP ON FRONTIERS IN HANDWRITING RECOGNITION p. 153–162 (1993), G. Srikantan, Gradient Representation for Handwritten Character Recognition THIRD INTERNATIONAL WORKSHOP ON FRONTIERS IN HANDWRITING RECOGNITION p. 318–23 (1993) and L. Tu, W. Lin, Y. Chan & I. Shyu, A PC Based Handwritten Chinese Character Recognition System THIRD INTERNATIONAL WORKSHOP ON FRONTIERS IN HANDWRITING RECOGNITION p. 349–54 (1993).

As noted above, a typical character recognition system 10 compares the feature values extracted from inputted characters against a predetermined database of feature value vectors of model characters. Such a database may be organized in a number of ways. For instance, U.S. Pat. No. 5,050,219 (Maury) teaches a character recognition database organized according to a tree structure. Each leaf node of the tree contains a character which can be recognized. Each non-leaf node of the tree contains a particular one of a plurality of predetermined feature comparisons which should be performed on the inputted character feature values. Based on the results of the comparison at such a non-leaf node, the database is traversed to a particular attached child node. In the comparison step, the tree is traversed until a leaf node is reached. The character is then recognized as the character corresponding to the leaf node.

Other character recognition databases are flat. Such character recognition databases contain at least one vector of feature values for each model character to be recognized. The inputted character feature values are compared to each vector of feature values. The inputted character is then recognized as the model character corresponding to the vector of feature values which best match the feature value vector of the inputted character.

A flat character recognition database such as used above is conventionally generated as follows. Multiple training character samples are inputted to the system 10 of FIG. 1 for each model character which can be recognized. Feature values are then extracted for each training character sample. Typically, this results in too many feature value vectors to be practically stored or accessed for purposes of making comparisons. Therefore, the feature value vector database is compacted. To that end, the processor 20 illustratively organizes the characters into classes. For instance, the processor 20 initially forms one or more classes for each model character, and places each training character sample of each model character into a respective class. Thereafter, the processor 20 assigns one or more prototype feature value vectors for representing each class. For instance, the processor may form the mean feature value vector in each class, and assign the respective mean feature value vector to the class as a prototype feature value vector. This prototype feature value vector is said to represent a prototype, or virtual representative, character of the class. (U.S. patent application Ser. No. 08/313,686 proposes an alternative scheme for classifying and selecting prototype feature value vectors for each class.)

In U.S. Pat. No. 4,773,099, Bokser discloses a method for organizing a recognition data base into so-called "ringed clusters". These ringed clusters include "certainty spheres" for character identification with certainty, "confidence spheres" for character identification without certainty but with some confidence level, and "possibility spheres" for classification of unknown characters.

Bokser further delineates the ringed clusters into "coarse", "medium", and "fine" categories, depending on the desired degree of accuracy in classifying the input characters.

Regarding the above described prior art in general, the basis for accepting or rejecting unknown input data by comparison with a feature value vector type of data base may be summarized as follows:

Let x denote the feature value vector of an unknown input pattern/character

Let $r_k$ denote the feature value vector of a prototype of class k

Let M denote the nearest class to the feature value vector x, i.e., the class having a prototype feature value vector nearest to the feature value vector x.

Let S denote the second nearest class to the feature value vector x

Let CR denote a class region threshold for precise recognition

Let DA denote a Dis-Ambiguity threshold for decisive classification

Let D denote a distance function, where the minimum distance criterion is expressed as $$D(x, r_M) = \min_{(k=1)}^{K} D(x, r_k) \tag{4a}$$

and $$D(x, r_S) = \min_{k=1}^{K} D(x, r_k), \text{ for } k \neq M \tag{4b}$$

Then, for pattern/character recognition, $$\text{class\_of}(x) = \begin{cases} M, & \text{when } D(x, r_M) = \min_{k=1}^{K} D(x, r_k) \\ & \text{and } D(x, r_M) < CR; \\ \text{rejected,} & \text{otherwise} \end{cases} \tag{5}$$

and, for pattern/character ambiguity, $$\text{class\_of}(x) = \begin{cases} M, & \text{when } D(x, r_M) = \min_{k=1}^{K} D(x, r_k) \\ & \text{and } D(x, r_S) - D(s, r_M) > DA; \\ \text{rejected,} & \text{otherwise} \end{cases} \tag{6}$$

Ideally, a recognition system is expected to be able to detect both ambiguous and non-character patterns. Accordingly, a criterion for rejecting both of them is a combined equation:

$$\text{class\_of}(x) = \begin{cases} M, & \text{when } D(x, r_M) = \min_{k=1}^{K} D(x, r_k) \\ & \text{and } D(x, r_M) < CR \\ & \text{and } D(x, r_S) - D(x, r_M) > DA; \\ \text{rejected,} & \text{otherwise} \end{cases} \tag{7}$$

Briefly stated, equation (7) states that M, the nearest class to x, is the class of the input pattern with feature value vector x, provided that the distance from M to x is no more than the threshold CR and that the distance from S, the second nearest class, to x is at least the threshold DA more than the distance from M to x.

There is one major drawback in equation (7). In particular, equation (7) uses only one DA and one CR, so that the two thresholds are not sensitive to different classes. This results in either too much rejection or too much misrecognition. For example, if DA is small, then ambiguous samples may be misrecognized. On the other hand, if DA is large, samples tend to be rejected even when they are not ambiguous. For another example, if CR is small, a few samples belonging to a scattered class will be rejected. But if CR is large, non-character patterns close to a compact class will be recognized to this class erroneously.

FIG. 10 shows a pattern distribution of four classes in feature value space. In FIG. 10, each member of a class k (k ∈{A, B, C, D}) is denoted by symbol k. Classes A and B are neighboring to each other, and class A is much more scattered than class B. Classes C and D overlap each other such that samples of the two classes are impossible to be separated fully. On the assumption that all patterns of both classes A and B are recognized correctly under a current distance measurement, some members of either class C or class D will be misrecognized if DA is small. However, if DA is large, a few patterns belonging to either class A or class B will be unnecessarily rejected. Considering non-character patterns, if CR is small, a few samples of class A will be rejected. However, if CR is large, some non-character patterns close to class B will tend to be misrecognized to class B.

It is an object of the present invention to overcome the disadvantages of the prior art.

SUMMARY OF THE INVENTION

According to one embodiment, a method for decisive pattern recognition with high reliability is provided for systems utilizing feature value vector matching between unknown input data and prototypes of classes of model characters stored in the system database. The inventive method computes a unique class region threshold $CR_k$ and a unique dis-ambiguity threshold $DA_k$ for each model class k. A novel process for computing thresholds $CR_k$ and $DA_k$ is disclosed, which is based on representing each threshold as a cost function. The cost function is then minimized to derive the optimum values for $CR_k$ and $DA_k$.

When an unknown input data pattern, or character, is received, a feature value vector x is derived therefrom. Feature value vector x is then compared to the stored feature value vectors of the prototypes of each class to determine the nearest and second nearest classes (M and S, respectively). A decisive recognition or rejection is then made in accordance with the following equation:

$$\text{class\_of } (x) = \begin{cases} M, & \text{when } D(x, r_M) = \min_{k=1}^{K} D(x, r_k) \\ & \text{and } D(x, r_M) < CR_M \\ & \text{and } D(x, r_S) - D(x, r_M) > DA_M; \\ \text{rejected}, & \text{otherwise} \end{cases}$$

where

D denotes a distance function, $r_M$ denotes the matching prototype feature value vector of the nearest class M, $r_k$ denotes a prototype feature value vector of a class k, $r_S$ denotes the matching prototype feature value vector of the second nearest class S, $CR_M$ denotes the class region threshold for the nearest class M, and $DA_M$ denotes the dis-ambiguity threshold for the nearest class M.

An illustrative embodiment of the inventive method is more fully described below in conjunction with the following drawings.

DETAILED DESCRIPTION OF THE INVENTION

Figure 1:
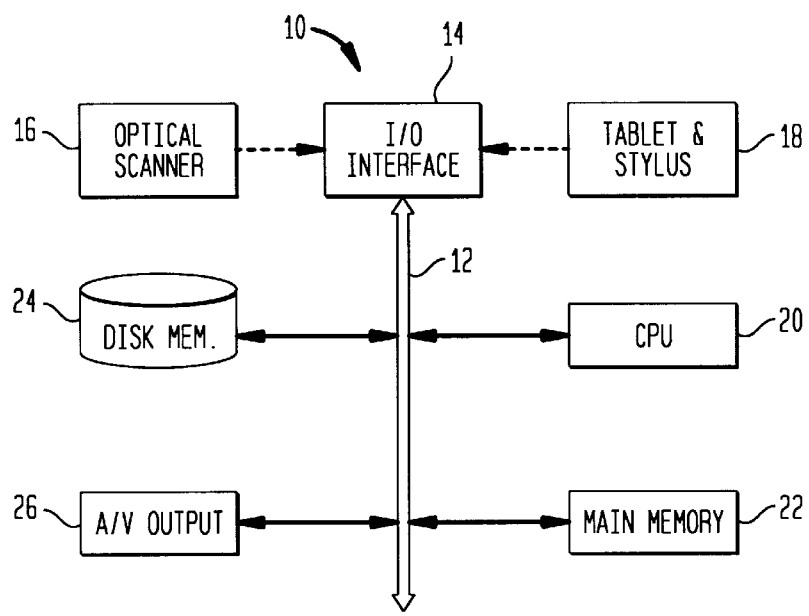
FIG. 1 depicts a conventional character recognition system.
Figure 2:
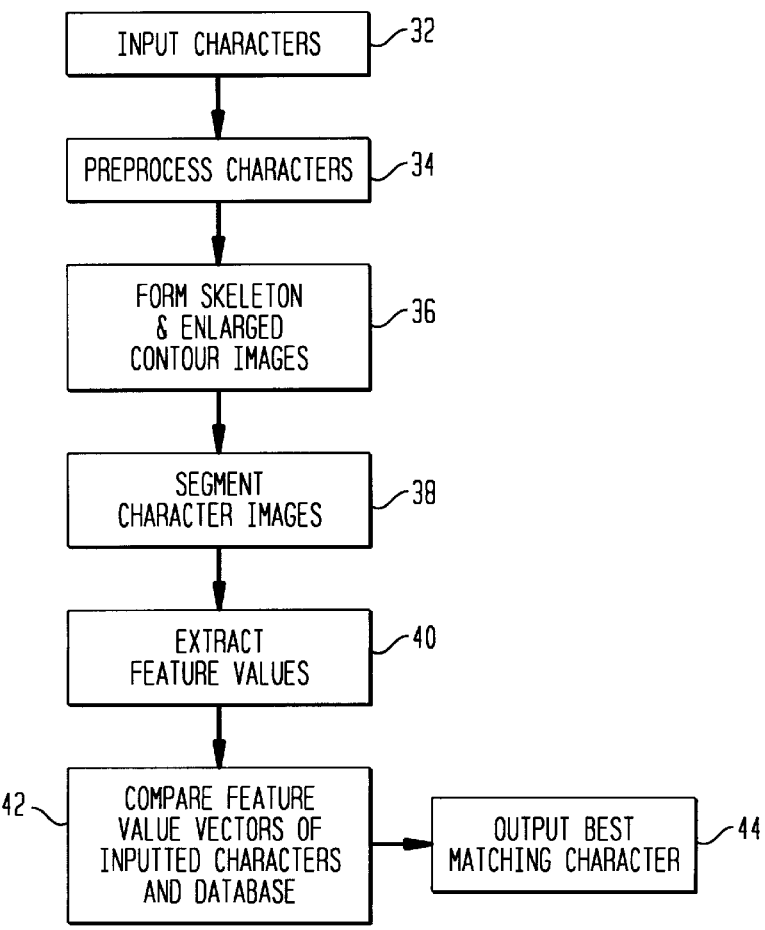
FIG. 2 is a flowchart which schematically illustrates a conventional character recognition process.
Figure 3:
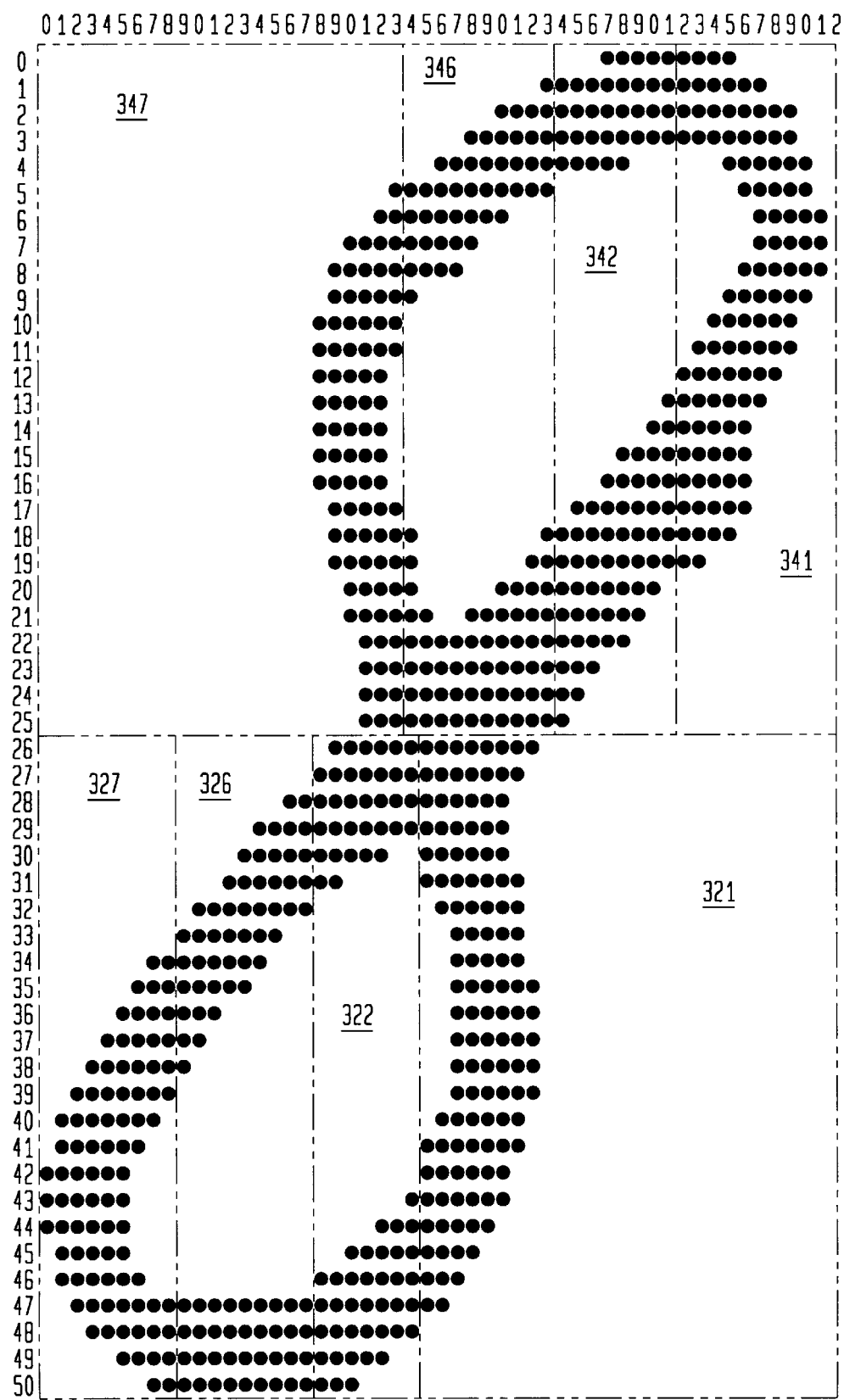
FIGS. 3–5 illustrate character segmentation.
Figure 4:
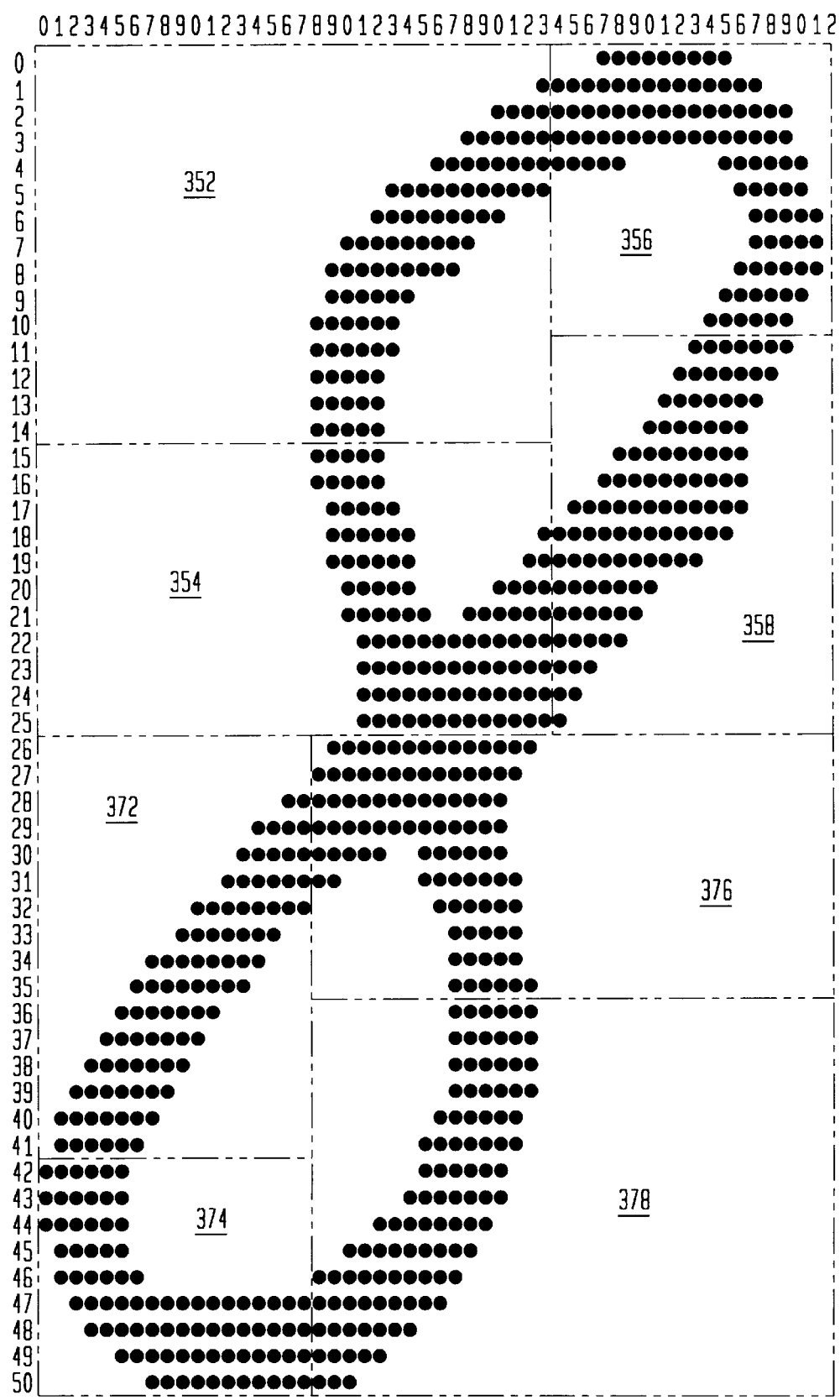
Figure 5:
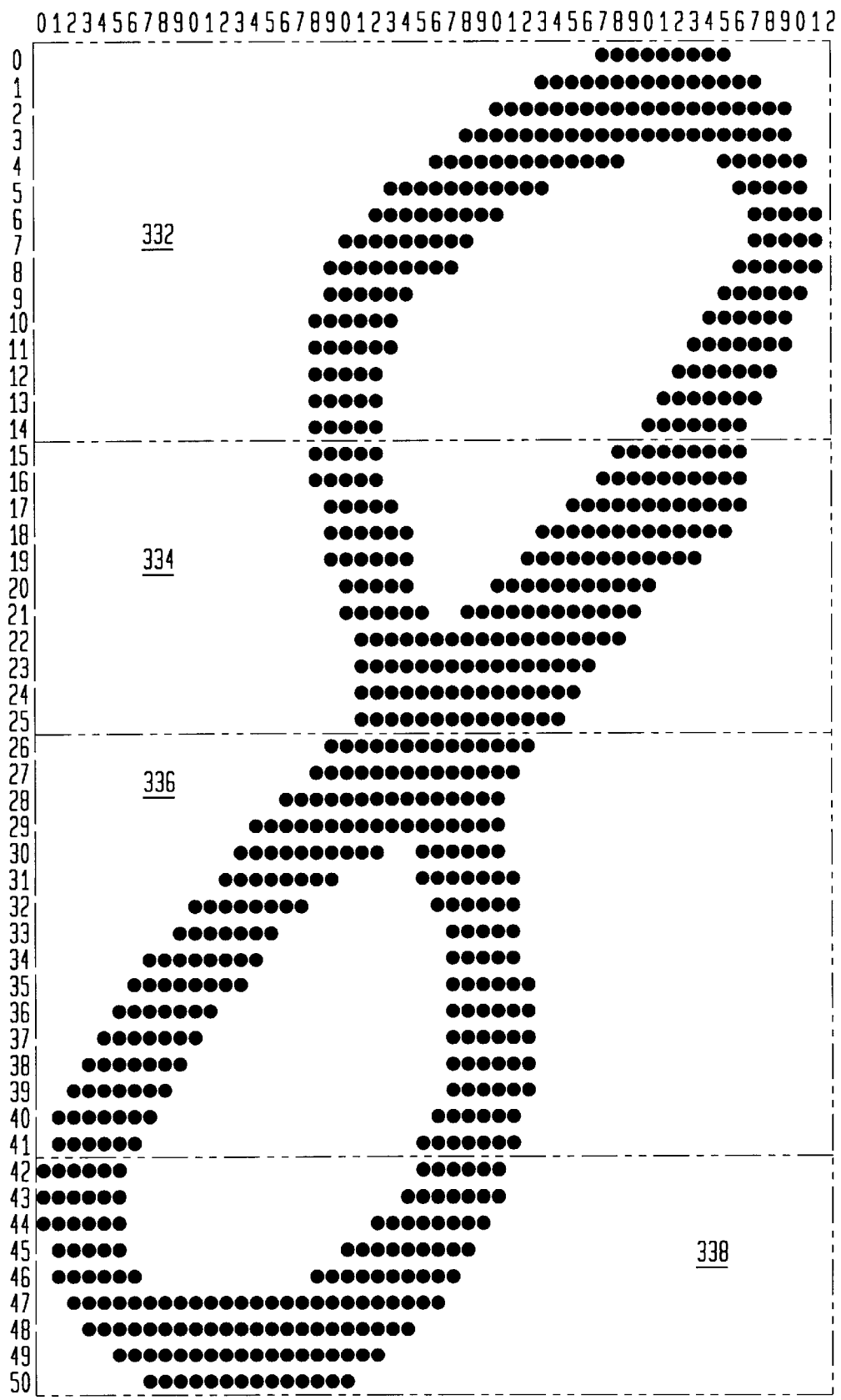
Figure 6:
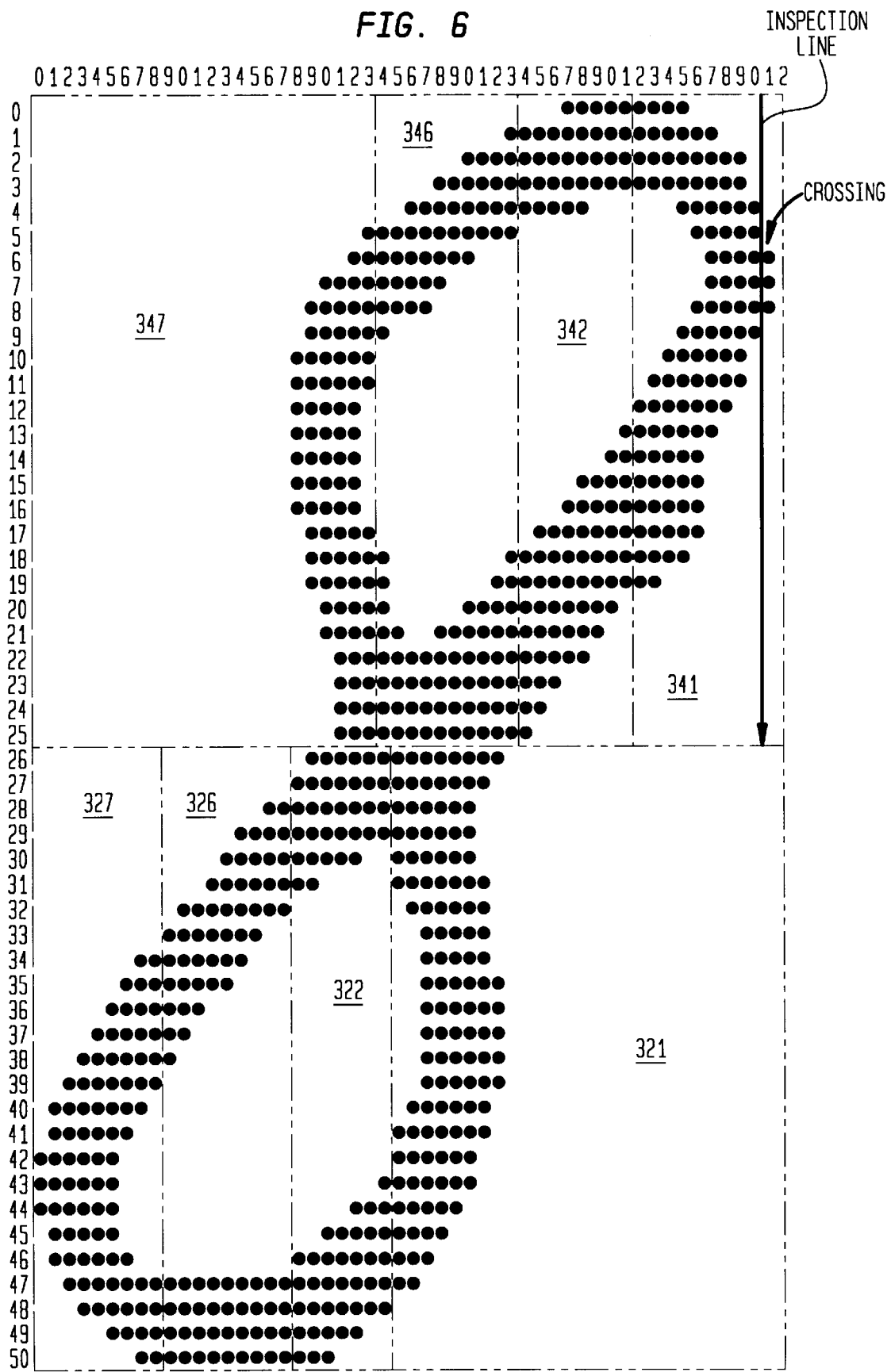
FIGS. 6–9 illustrate examples of character feature extraction.
Figure 7:
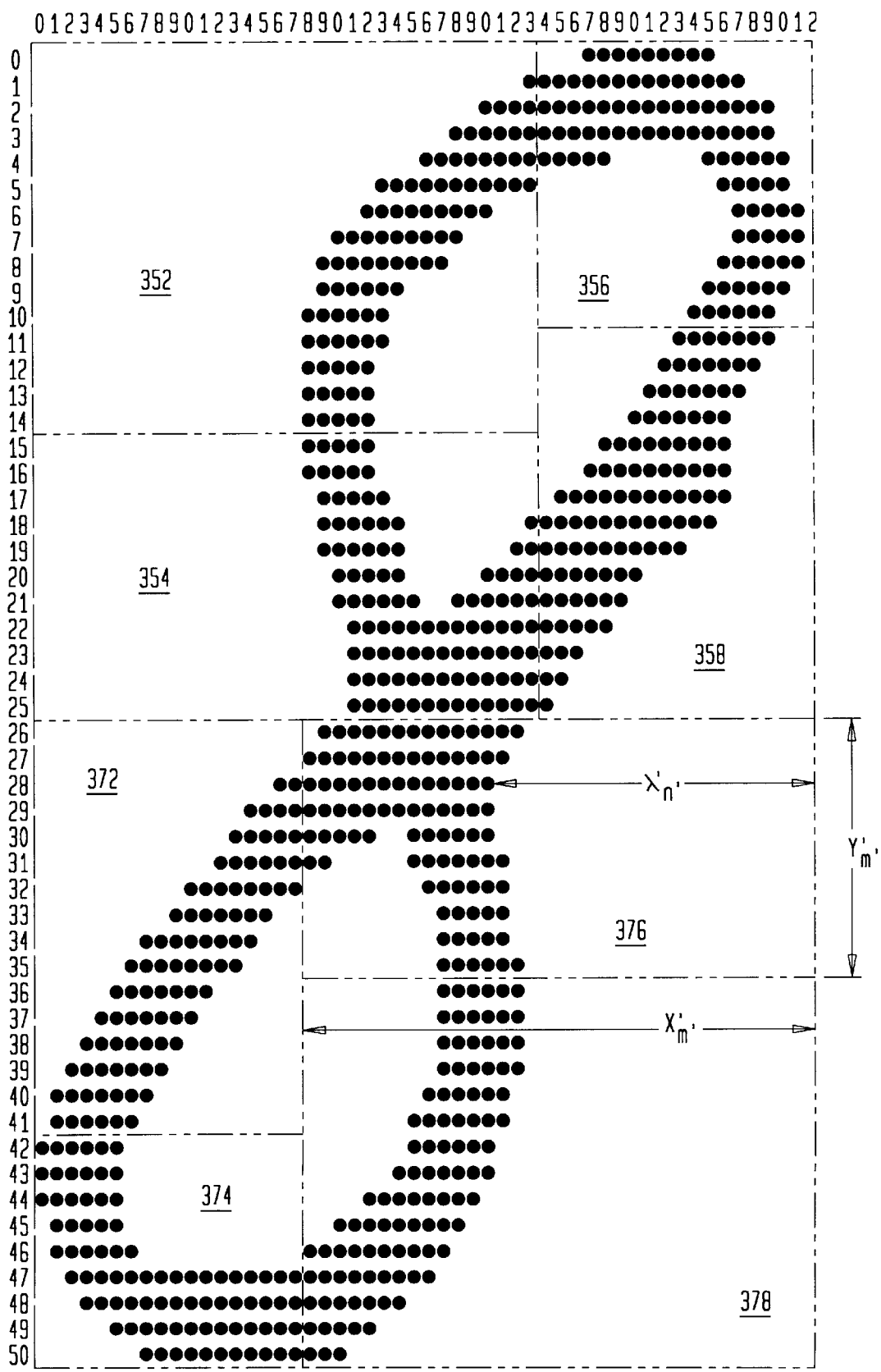
Figure 8:
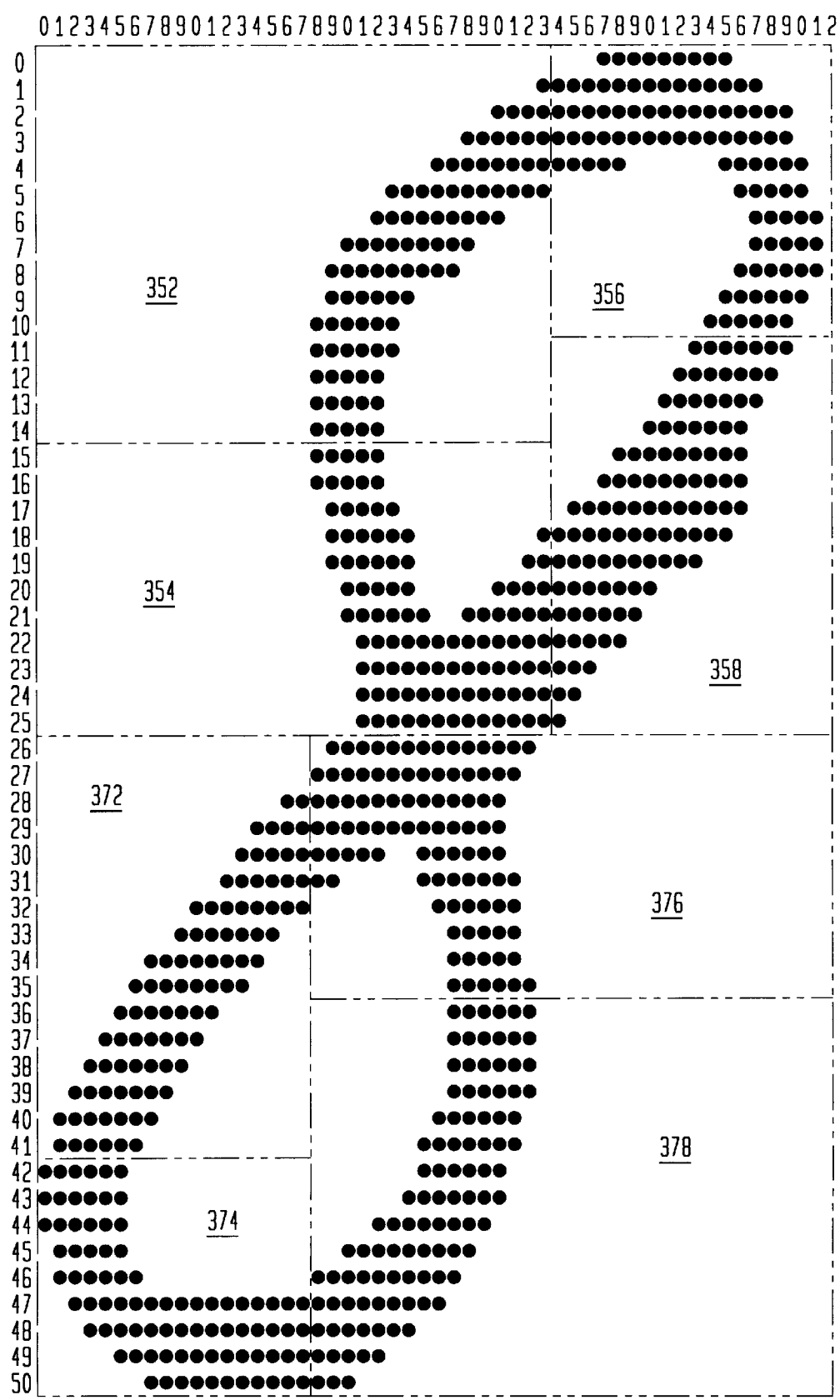
Figure 9:
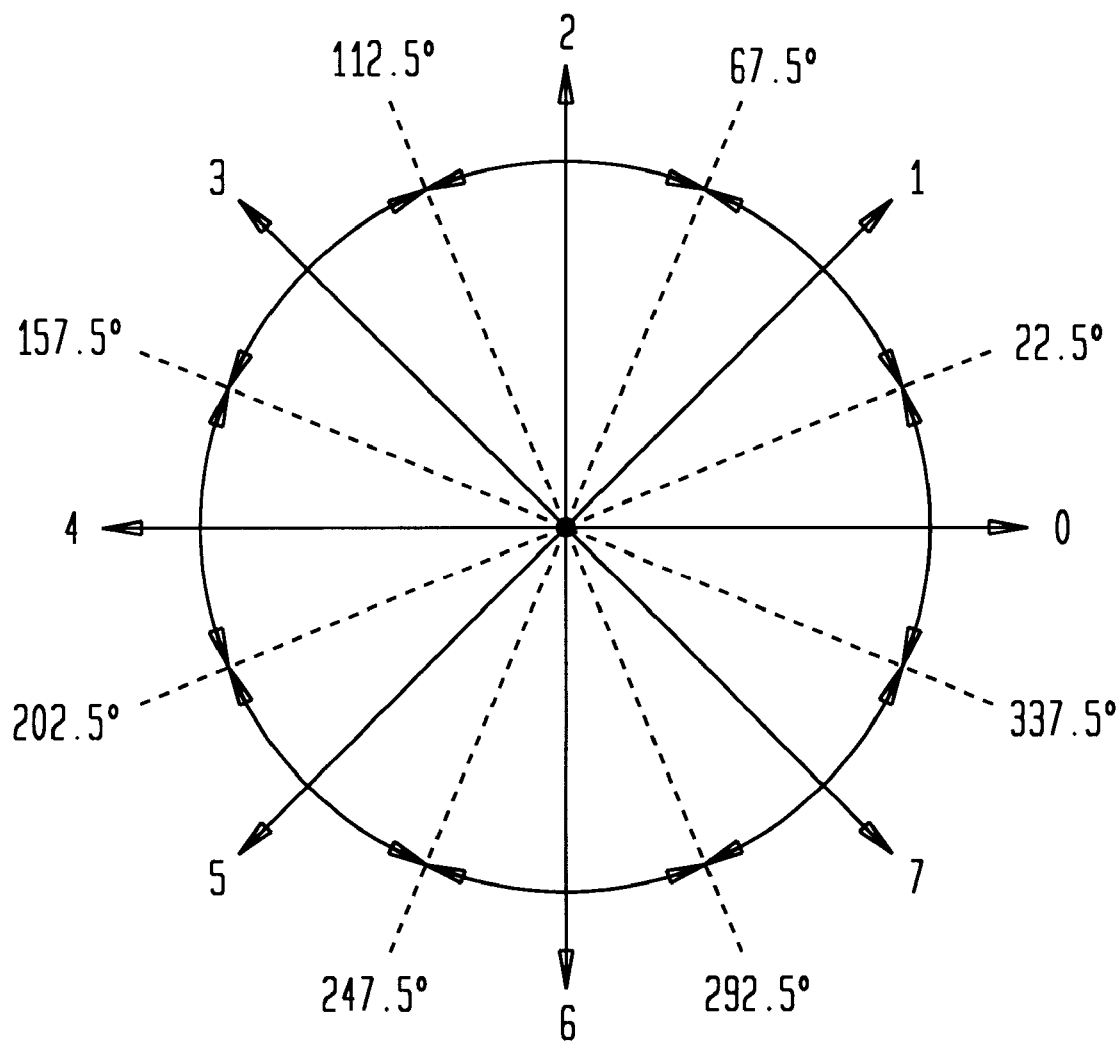
Figure 10:
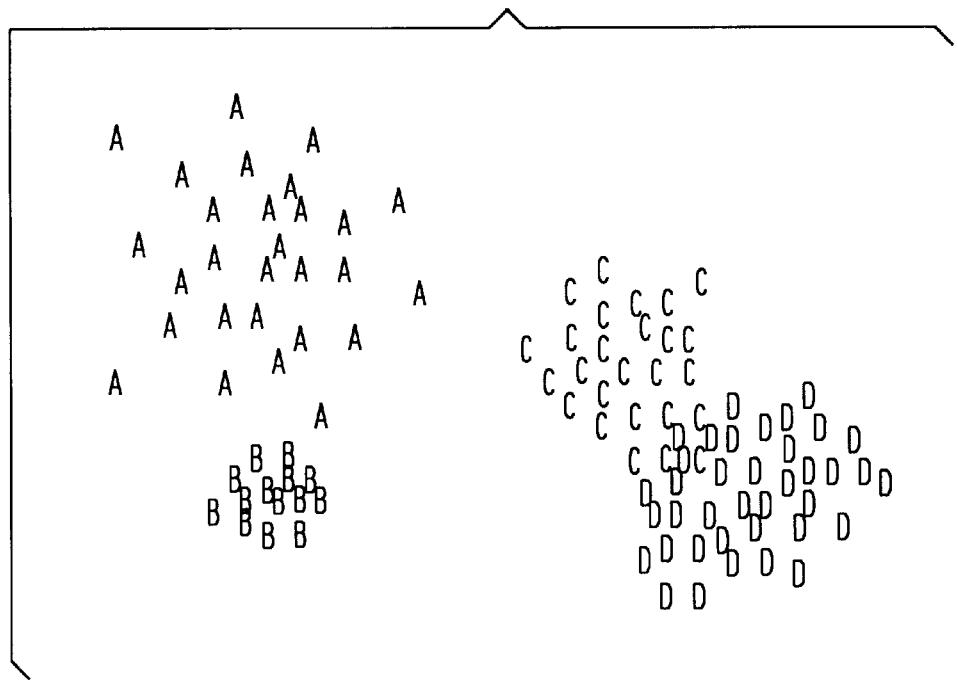
FIG. 10 illustrates a pattern distribution of four classes.
Figure 11:
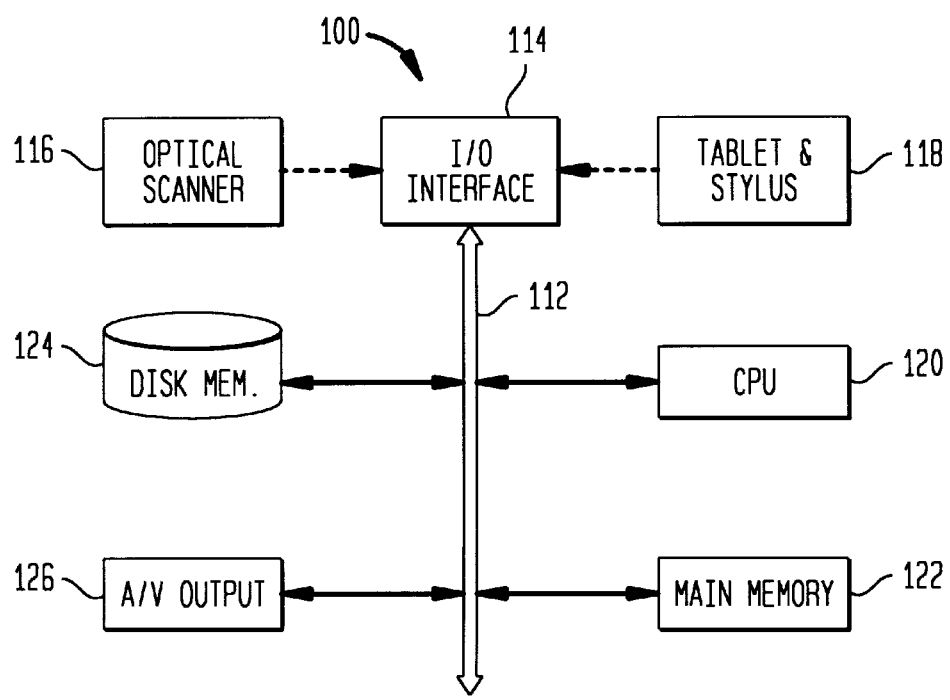
FIG. 11 illustrates a system for recognizing characters according to an embodiment of the present invention.

FIG. 11 illustrates a system 100 for recognizing characters inputted thereto. Like the system 10 in FIG. 1, the system 100 has an I/O interface 114 connected to a character input device such as an optical scanner 116, or a stylus and writing tablet 118, or both. The optical scanner 116 is capable of scanning in sheets on which machine printed or handwritten characters were previously formed and generating graphical image data of the inputted characters therefrom. The stylus and writing tablet 118 are capable of receiving handwritten characters which are manually inputted therewith and generating graphical image data of the inputted characters therefrom. The generated data may be transferred via the I/O interface 114 and bus 112 to a main memory 122 or disk memory 124. A processor 120 can process the data, in particular, can compare each inputted character to a database of prototypes to determine the best matching prototype. The inputted characters are recognized as the model character corresponding to the best matching prototypes. The recognized model characters then may be outputted via the audio/video output device 126.

Figure 12:
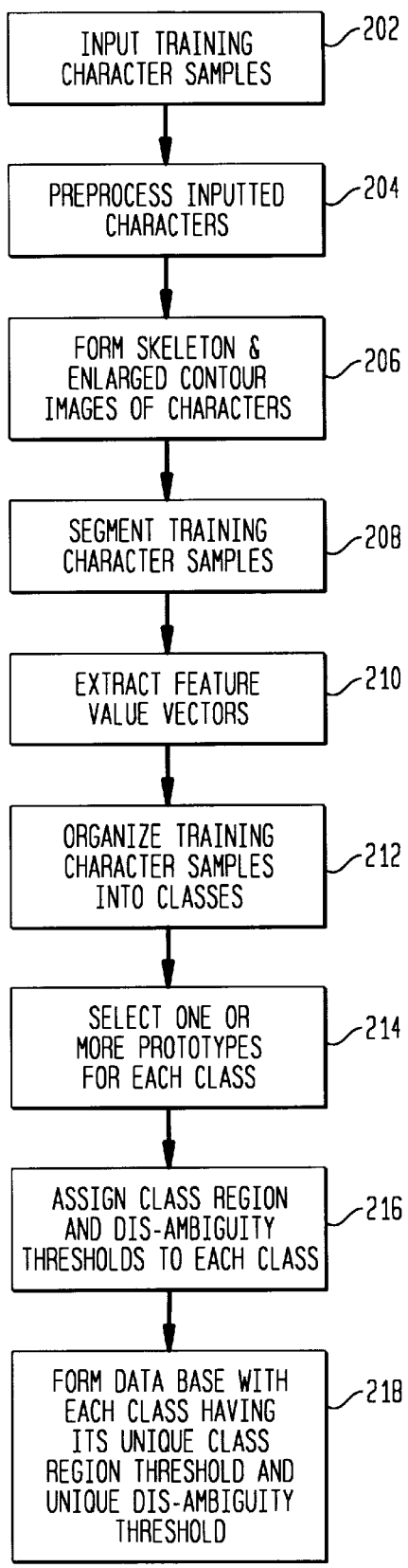
FIG. 12 illustrates a process for constructing a database according to an embodiment of the present invention.

The system 100, or other suitable similar system, is illustratively capable of generating the database of prototypes. Illustratively, this is achieved using a process which is schematically depicted in FIG. 12. According to a first step 202, training character samples are inputted via the optical scanner 116 of FIG. 11 or tablet and stylus 118. Graphical image data of the training character samples is stored in the memory 122 or 124. The training character sample data is then pre-processed to remove noise, etc., by the processor 120 in step 204. In step 206, the processor 120 forms skeleton images of each training character sample and then converts the skeleton images to enlarged contour images. In step 208, the processor 120 segments the training character samples. In step 210, the processor 120 extracts feature value vectors from each segmented training character sample. In step 212, the processor 120 organizes the training character samples into classes. This can be achieved in a number of ways such as is suggested in U.S. patent application Ser. No. 08/313,686. According to this patent application, the training character samples of each model character are divided into plural classes so as to better organize the training character samples which typically are non-uniformly distributed. Next, in step 214, the processor 120 selects one or more prototypes for each class. These prototypes may be selected by forming the mean feature value vector for each class and assigning the prototype feature value vector thereto. Alternatively, each class may be divided into subclasses and a mean feature value vector may be formed for each subclass. Each mean feature value vector formed for each subclass defines a prototype of the class.

After selecting the prototypes (and prototype feature value vectors), the processor 120 executes step 216 wherein a Class Region ($CR_k$) and a Dis-Ambiguity Threshold ($DA_k$) are assigned to each class. This is discussed in greater detail below. After assigning unique thresholds to each class, the processor 120 executes step 218 wherein the processor forms the database of prototypes having classes with optimized thresholds for each class. The database formed in step 218 may be a flat database, may be organized in a tree structure, etc. The optimized database then illustratively is stored in the main memory 122 or the disk memory 124.

Figure 13:
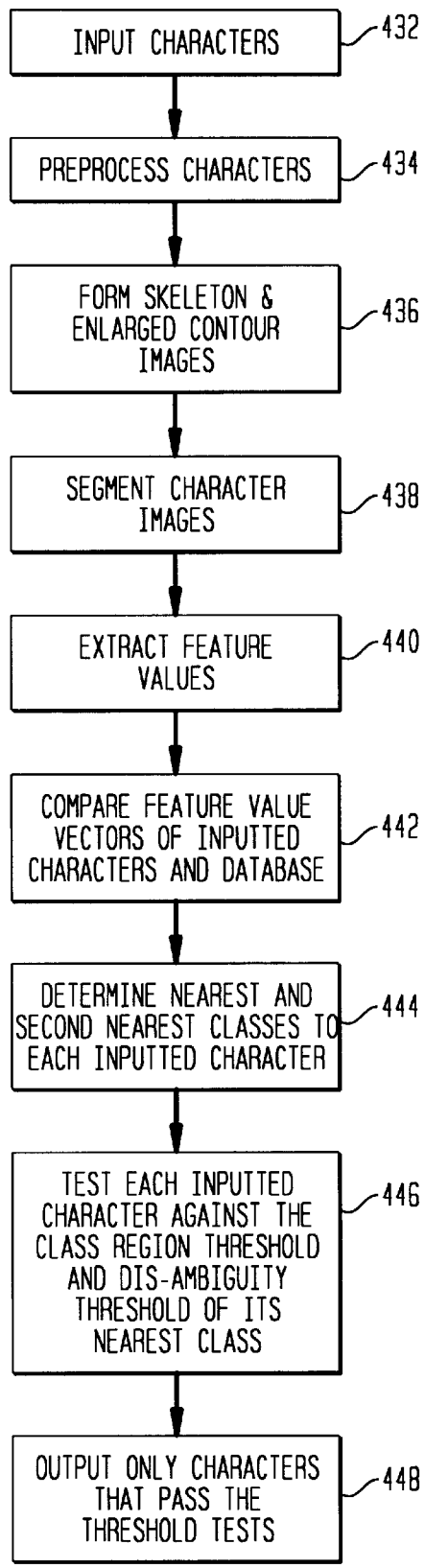
FIG. 13 illustrates a process for optimizing prototype classes according to an embodiment of the present invention.

FIG. 13 illustrates the inventive handwriting recognition process which may be executed by the character recognition system 100 of FIG. 11. In a first step 432, the inputted handwritten or machine printed characters are received from the stylus and tablet 118, or from sheets on which handwritten or machine printed characters have been previously handwritten or printed into the optical scanner 116. The stylus and tablet 118, or the optical scanner 116, in turn, transfers character data which graphically represents the handwritten or machine printed characters to the I/O interface 114. The I/O interface 114 transfers the character data via the system bus 112 to, for instance, the main memory 122.

Next in step 434, the processor 120 pre-processes the inputted character data stored in the main memory 122. Then, in step 436, the processor 120 optionally forms a skeleton image of each inputted character and converts the skeleton images to enlarge contour images. In step 438, the processor 120 segments the images of the characters for purposes of extracting feature values from the character images. Next, in step 440, the processor 120 extracts a vector of feature values for each inputted character. U.S. patent application Ser. No. 08/313,686 provides examples of features which may be extracted from characters segmented as shown in FIGS. 6–9.

After extracting a feature value vector for an inputted character, the processor 120 executes step 442. In step 442, the processor 120 compares the feature value vector of each inputted character to feature value vectors contained in a database of predetermined feature value vectors. Illustratively, this database may be stored in the disk memory 124 or the main memory 122. Based on these comparisons, the processor 120 determines the predetermined feature value vector which best matches the feature value vector of the inputted character. In step 444, the processor 120 determines the nearest and second nearest classes to the inputted character. Then, in step 446, the processor 120 tests the inputted character against the predetermined class region threshold and dis-ambiguity threshold of the nearest class. Finally, in step 448, the processor 120 recognizes only those characters that pass both threshold tests, and then outputs those characters.

To achieve step 446, above with high reliability, the processor 120 utilizes an inventive recognition criterion, as follows:

$$\text{class\_of}(x) = \begin{cases} M, & \text{when } D(x, r_M) = \min_{k=1}^{K} D(x, r_k) \\ & \text{and } D(x, r_M) < CR_M \\ & \text{and } D(x, r_S) - D(x, r_M) > DA_M; \\ \text{rejected}, & \text{otherwise} \end{cases} \quad (8)$$

In this approach, each class k is assigned its own dis-ambiguity threshold $DA_k$ and class region threshold $CR_k$. In general, the more scattered a class is, the larger its region threshold $CR_k$ will be. Also, the more ambiguous a class is to other classes, the larger its dis-ambiguity threshold $DA_k$ should be. In the present invention, a process to compute $DA_k$ and $CR_k$ effectively for each class k is disclosed. First, a cost function closely corresponding to $DA_k$ and $CR_k$ thresholds for $1 \leq k \leq K$ are derived, as described below.

In a decision-making system, the ultimate goal is to make a correct decision in every case. However, unless the encountered problem is quite simple, there are always some cases which are difficult or even impossible to decide correctly. Therefore, for those cases, it is better for the system to reject them, and to let human experts process them manually. Thus, extra cost is required to process the rejected cases. On the other hand, if the system does not reject an ambiguous case, but instead makes a wrong decision, this error will likely cause significant damage to the corresponding application. Accordingly, either a rejection or a wrong decision results in extra cost in terms of time, money or damage. Therefore, the costs associated with a decision making process should be as low as possible.

Assume the cost of an incorrect decision is $\alpha$ times that of a rejection. That is, $$\text{cost\_of (an error)} = \alpha * \text{cost\_of (a rejection)}$$

For a recognition system, the cost function is then defined as $$E = \text{the total sample number of the rejected patterns} + \alpha * \text{the total sample number of the misrecognized patterns} \quad (9)$$

The rejected patterns can be divided into two groups: the reject-from-right group, and the reject-from-wrong group. The reject-from-right/reject-from-wrong groups consist of the patterns which are rejected by the system. If the system makes a decisive decision, the decision will be either correct or wrong. Hence, the defined cost function becomes $$E = \text{the total sample number of the reject-from-right group} + \quad (10)$$
$$\text{the total sample number of the reject-from-wrong group} +$$
$$\alpha * \text{the total sample number of the misrecognized patterns}.$$

Let M, S, and I denote respectively the nearest class to an input pattern with feature value x, the second nearest class to the input pattern, and the ground-truth class of the input pattern. Let $O_k$ be the distance $D(x, r_k)$ for all $1 \leq k \leq K$. That is:

$$O_k = D(x, r_k) \quad (11)$$

Upon further analysis of the rejected patterns, it has been discovered that there are two threshold conditions which result in a pattern rejection, regardless of whether the pattern belongs to the reject-from-right group or the reject-from-wrong group. According to the first condition, the input pattern is rejected if the distance between an input pattern and its nearest class M is larger than the class region threshold of class M. That is:

if $D(x, r_M) > CR_M$, then x is rejected.

According to the second condition, the input pattern is rejected if the distance from the input pattern to its second nearest class S, less the distance from the input pattern to its nearest class M, is smaller than the dis-ambiguity threshold of class M. That is:

if $D(x, r_S) - D(x, R_M) < DA_M$, then x is rejected.

Accordingly, a pattern is rejected when it corresponds to either of the following two situations:

Situation 1: $D(x, r_M) > CR_M$;

Situation 2: $D(x, r_M) < CR_M$ and $D(x, r_S) - D(x, r_M) < DA_M$.

Therefore, the cost function can be further defined as:

$E$ = the total sample number of the reject-from-right group + caused by situation 1 (12)

the total sample number of the reject-from-right group + caused by situation 2 the total sample number of the reject-from-wrong group + caused by situation 1 the total sample number of the reject-from-wrong group + caused by situation 2

$\alpha *$ the total sample number of the misrecognized patterns

Cost function E can now be expressed in mathematical form so that the minimization of cost function E can be derived systematically. A novel mathematical expression representing the cost function of an input pattern with feature value vector x is proposed as:

$$E(x) = \left[ \frac{1}{1+e^{\frac{CR_I - O_I}{A}}} + \frac{1}{1+e^{\frac{O_I - CR_I}{A}}} * \frac{1}{1+e^{\frac{(O_S - O_I) - DA_I}{A}}} \right] * \quad (13)$$

$$e^{\frac{O_M - O_I}{A}} + \left[ \frac{1}{1+e^{\frac{CR_M - O_M}{A}}} + \right.$$

$$\left. \frac{1}{1+e^{\frac{O_M - CR_M}{A}}} * \frac{1}{1+e^{\frac{(O_S - O_M) - DA_M}{A}}} \right] * \left(1 - e^{\frac{O_M - O_I}{A}}\right) +$$

$$\alpha * \frac{1}{1+e^{\frac{O_M - CR_M}{A}}} * \frac{1}{1+e^{\frac{DA_M - (O_S - O_M)}{A}}} * \left(1 - e^{\frac{O_M - O_I}{A}}\right)$$

where A is a bandwidth parameter, sometimes called the width of the respective field of the sigmoid function, which governs the size of the active area of the sigmoid function. Essentially, A is a monotonically decreasing function with a considerably large initial value and a very small positive final value.

To derive equation (13) for cost function E(x), assume A is a very small positive value (e.g. 0.0000001). First, the function $\exp[(O_M - O_I)/A]$ is used to evaluate whether a pattern x is correctly recognized or not. That is:

$$e^{\frac{O_M - O_I}{A}} = \begin{cases} 1, \text{ when } O_M = O_I; & \text{(correctly recognized)} \\ 0, \text{ otherwise.} & \text{(wrongly recognized)} \end{cases} \quad (14)$$

When the input pattern is correctly recognized, the value of this function becomes 1 (since $O_M = O_I$). Otherwise, the input pattern is misrecognized, and the value of this function is 0 (since $O_M \neq O_P$, and $O_M < O_I$). Accordingly, the function $1 - \exp[(O_M - O_I)/A]$ can be used to evaluate whether the input pattern is correctly recognized or incorrectly recognized. That is:

$$1 - e^{\frac{O_M - O_I}{A}} = \begin{cases} 0, \text{ when } O_M = O_I; & \text{(correctly recognized)} \\ 1, \text{ otherwise.} & \text{(wrongly recognized)} \end{cases} \quad (15)$$

When the input pattern is correctly recognized, the value of this function becomes 0. When the input pattern is wrongly recognized, the value of this function becomes 1. Two additional functions are used to evaluate the above two rejection situations. That is, for situation 1:

$$\frac{1}{1+e^{\frac{CR_M - O_M}{A}}} = \begin{cases} 1, \text{ when } CR_M < O_M; & \text{(reject)} \\ 0, \text{ otherwise.} & \text{(pass)} \end{cases} \quad (16)$$

and, for situation 2:

$$\frac{1}{1+e^{\frac{O_M - CR_M}{A}}} * \frac{1}{1+e^{\frac{(O_S - O_M) - DA_M}{A}}} = \quad (17)$$

$$\begin{cases} 1, \text{ when } CR_M \geq O_M \text{ and } (O_S - O_M) < DA_M; & \text{(reject)} \\ 0, \text{ otherwise.} & \text{(pass)} \end{cases}$$

For situation 1, when the distance $O_M$ between the input pattern and its nearest class M is larger than or equal to the class region threshold $CR_M$ of class M, the value of the first function is 1, indicating the rejection of the input pattern with feature value vector x. Otherwise, the value is 0, indicating the pass of the input pattern from the first criterion.

When $CR_M \geq O_M$, the input pattern passes the first situation. In addition, if the difference of the distance between the input pattern and its second nearest class S ($O_S$) and that between the input pattern and its nearest class M ($O_M$) is smaller than the dis-ambiguity threshold ($DA_M$), then the value of the second function is 1, indicating the pattern is ambiguous, and is rejected. Otherwise, the value of the second function is 0, indicating the input pattern with feature value vector x passes the second criterion as well as the first.

Combining equations (14), (15), (16), and (17), produces:

$$\left( \frac{1}{1+e^{\frac{CR_I - O_I}{A}}} + \frac{1}{1+e^{\frac{O_I - CR_I}{A}}} * \frac{1}{1+e^{\frac{(O_S - O_I) - DA_I}{A}}} \right) * e^{\frac{O_M - O_I}{A}} = \quad (18)$$

$$\begin{cases} 1, \text{ when } O_M = O_I \text{ and } CR_I < O_I; & \text{(correctly recognized but rejected by situation 1)} \\ 1, \text{ when } O_M = O_I \text{ and } CR_I \geq O_I \\ \quad \text{and } O_S - O_I < DA_I; & \text{(correctly recognized but rejected by situation 2)} \\ 0, \text{ otherwise.} \end{cases}$$

and,

-continued $$\left(\frac{1}{1+e^{\frac{CR_M-O_M}{A}}}+\frac{1}{1+e^{\frac{O_M-CR_M}{A}}}*\frac{1}{1+e^{\frac{(O_S-O_M)-DA_M}{A}}}\right)*\left(1-e^{\frac{O_M-O_I}{A}}\right)= \quad (19)$$

$$\begin{cases} 1, & \text{when } O_M \neq O_I \text{ and } CR_I < O_I; \quad \text{(wrongly recognized but rejected by situation 1)} \\ 1, & \text{when } O_M \neq O_I \text{ and } CR_M \geq O_I \\ & \text{and } O_S - O_M < DA_M; \quad \text{(wrongly recognized but rejected by situation 2)} \\ 0, & \text{otherwise.} \end{cases}$$

and, $$\frac{1}{1+e^{\frac{O_M-CR_M}{A}}}*\frac{1}{1+e^{\frac{DA_M-(O_S-O_M)}{A}}}*\left(1-e^{\frac{O_M-O_I}{A}}\right)=$$

$$\begin{cases} 1, & \text{when } O_M \neq O_I, \text{ and } (R_M > O_M), \\ & \text{and } O_S - O_M > DA_M; \quad \text{(wrongly recognized but accepted)} \\ 0, & \text{otherwise;} \end{cases}$$

If A and α of equation (13) for E(x) are given, then E(x) will depend only on $CR_I$, $DA_I$, $CR_M$ and $DA_M$. Therefore, minimizing the cost function E(x) will derive the optimum $CR_k$ and $DA_k$ thresholds for all classes k ($1 \leq k \leq K$).

To simplify the discussion further, let $$f = \frac{1}{1+e^{\frac{CR_I-O_I}{A}}},$$

$$g = \frac{1}{1+e^{\frac{O_I-CR_I}{A}}},$$

-continued $$h = \frac{1}{1+e^{\frac{(O_S-O_I)-DA_I}{A}}},$$

$$m = \frac{1}{1+e^{\frac{CR_M-O_M}{A}}},$$

$$p = \frac{1}{1+e^{\frac{O_M-CR_M}{A}}},$$

$$r = \frac{1}{1+e^{\frac{(O_S-O_M)-DA_M}{A}}},$$

$$s = \frac{1}{1+e^{\frac{DA_M-(O_S-O_M)}{A}}}.$$

Then, the cost function can be rewritten as $$E(x) = [f + g*h]*e^{\frac{O_M-O_I}{A}} + [m+p*r]*\left(1-e^{\frac{O_M-O_I}{A}}\right) + \alpha*p*s*\left(1-e^{\frac{O_M-O_I}{A}}\right)$$

By using a threshold updating procedure, herein designated as the "gradient descend algorithm" (to be described below), optimum thresholds for $CR_k$ and $DA_k$ are iteratively updated during successive iterations with:

$$\frac{\partial E(x)}{\partial CR_k} \approx \begin{cases} [f*(f-1)+g(1-g)*h]*e^{\frac{O_M-O_I}{A}}, & \text{when } k=I; \\ [m*(m-1)+p*(1-p)*r]\left(1-e^{\frac{O_M-O_I}{A}}\right) + \\ \alpha*p*(1-p)*k*\left(1-e^{\frac{O_M-O_I}{A}}\right), & \text{when } k=M \text{ and } I \neq M; \\ 0, & \text{otherwise} \end{cases} \quad (20)$$

and, $$\frac{\partial E(x)}{\partial DA_k} \approx \begin{cases} g*h*(h-1)*e^{\frac{O_M-O_I}{A}}, & \text{when } k=I; \\ [p*r*(r-1)+\alpha*p*k*(1-k)]\left(1-e^{\frac{O_M-O_I}{A}}\right), & \text{when } k=M \text{ and } I \neq M; \\ 0, & \text{otherwise} \end{cases} \quad (21)$$

The aforementioned updating gradient descend algorithm is summarized as follows:

STEP 1 establish a monotonically decreasing function value A, and initialize values of thresholds $CR_k$ and $DA_k$ with the following equations:

$$CR_k = 1.5 * \frac{\sum_{i=1}^{N_k} D(x_i^k, r_{iM})}{N_k}$$

$$DA_k = 0.5 * \frac{\sum_{i=1}^{N_k} (D(x_i^k, r_{iS}) - D(x_i^k, r_{iM}))}{N_k}$$

where:
$N_k$ is the total training sample number of class k $x^k_i$ is the ith training feature vector of class k $r_{iM}$ is the closest prototype feature vector of class x $r_{iS}$ is the second closest prototype feature vector to X STEP 2 for all input pattern samples:
  (a) compute all distance values $D_k=D(x,r_k)$,
  (b) identify the nearest class M corresponding to distance $D_M=\min_{1\leq j\leq K} D_k$,
  (c) identify the second nearest class S corresponding to distance $D_S=\min_{k=1,k\neq M} D_k$,
  (d) compute the accumulated cost using the cost function E(x) equation (13),
  (e) update thresholds $CR_k$ and $DA_k$ using equation (20), STEP 3 IF the accumulated cost is smaller than the cost termination threshold or the number of iterations equals the maximum iteration number
  THEN stop the iterative process
  ELSE reduce A and repeat STEP 2.

Figure 14:
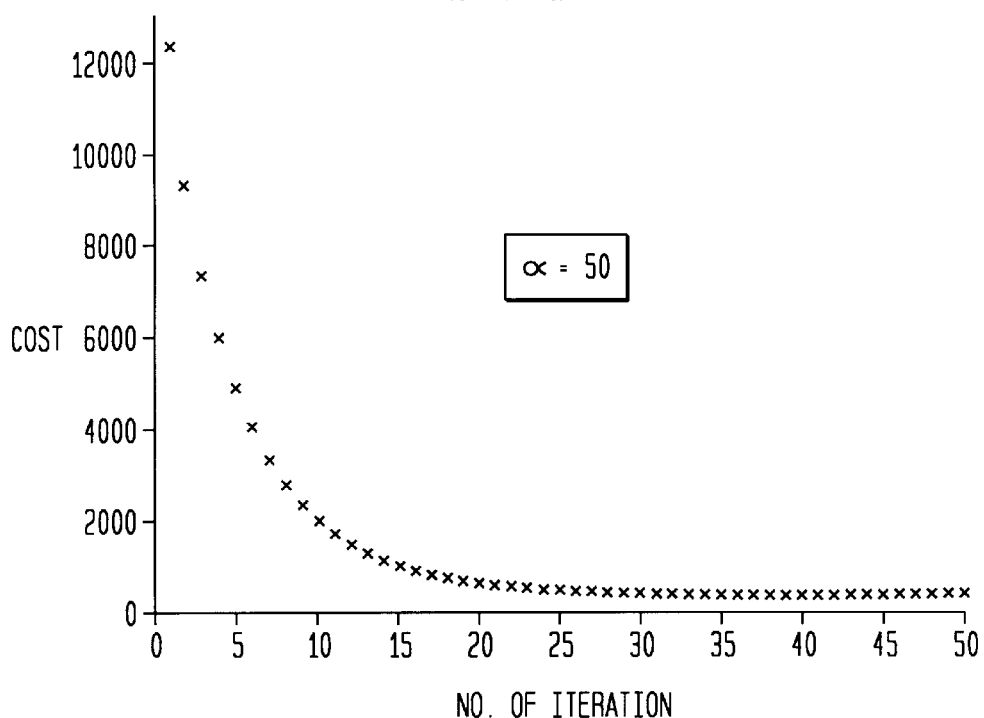
FIG. 14 illustrates a distribution of the inventive cost function with $\alpha=50$.

The process disclosed herein may be implemented in a Sun Microsystems™ computer programmed in the C language. An experimental database was used containing 6092 handwritten Chinese characters. However, only the most frequently used 400 Chinese characters were included in this experiment. Two hundred character samples were provided per model Chinese character, with the odd-number samples being used to derive the optimized disambiguity and class region thresholds of each class, and the even-number samples being used to test the classification performance. The total epoch number α is set to 50. FIG. 14 shows the cost distribution of 50 iterations with α=50. As shown in FIG. 14, for the training data set, the cost function is decreased continuously until it reaches a certain stable situation. Tables 1 and 2 lists the recognition performance of the training and the testing data sets (PTrain and PTest, respectively) with different values of α.

TABLE 1

| α | no/rate of recog | no/rate of reject | no/rate of error | reliability |
|---|---|---|---|---|
| 1 | 25403 (70.9%) | 10178 (28.4%) | 241 (0.67%) | 0.9906 |
| 5 | 25444 (71.0%) | 10177 (28.4%) | 201 (0.56%) | 0.9922 |
| 10 | 25065 (70.0%) | 10641 (29.7%) | 116 (0.32%) | 0.9954 |
| 20 | 24197 (67.5%) | 11580 (32.3%) | 45 (0.12%) | 0.9981 |
| 30 | 23401 (65.3%) | 12400 (34.6%) | 21 (0.6%) | 0.9991 |
| 40 | 22732 (63.5%) | 13084 (36.5%) | 6 (0.02%) | 0.9997 |
| 50 | 22009 (61.4%) | 13813 (38.6%) | 0 (0.00%) | 1.0000 |
| 60 | 21545 (60.1%) | 14277 (39.9%) | 0 (0.00%) | 1.0000 |
| 70 | 20973 (58.5%) | 14849 (41.5%) | 0 (0.00%) | 1.0000 |
| 80 | 20348 (56.8%) | 15474 (43.2%) | 0 (0.00%) | 1.0000 |

TABLE 2

| α | no/rate of recog | no/rate of reject | no/rate of error | reliability |
|---|---|---|---|---|
| 1 | 24448 (68.6%) | 10933 (30.7%) | 253 (0.71%) | 0.9898 |
| 5 | 24463 (68.7%) | 10941 (30.7%) | 230 (0.65%) | 0.9907 |
| 10 | 24026 (67.4%) | 11402 (32.0%) | 206 (0.58%) | 0.9915 |
| 20 | 23078 (64.8%) | 12402 (34.8%) | 154 (0.43%) | 0.9934 |
| 30 | 22297 (62.6%) | 13198 (37.0%) | 139 (0.39%) | 0.9938 |
| 40 | 21584 (60.6%) | 13923 (39.1%) | 127 (0.36%) | 0.9942 |
| 50 | 20914 (58.7%) | 14609 (41.0%) | 111 (0.31%) | 0.9947 |
| 60 | 20457 (57.4%) | 15076 (42.3%) | 101 (0.28%) | 0.9951 |
| 70 | 19925 (55.9%) | 15613 (43.8%) | 96 (0.27%) | 0.9952 |
| 80 | 19323 (54.2%) | 16223 (45.5%) | 88 (0.25%) | 0.9955 |

Obviously, the reliability of recognition is increased as α is increased. Therefore, by using different values of α, different degrees of recognition reliability were obtained.

Figure 15:
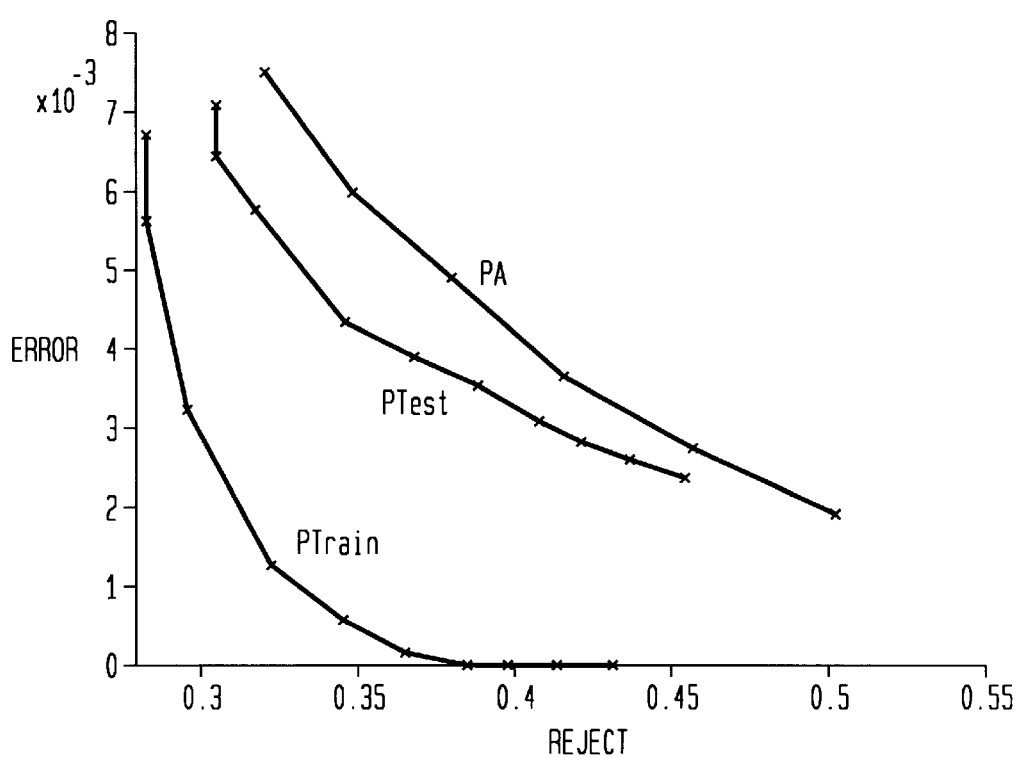
FIG. 15 illustrates a recognition performance comparison between the inventive method and the prior art.

FIG. 15 shows the corresponding rejection-error performance graph of tables 1 and 2. For comparison, another experiment was performed using constant values CR and DA and the prior art equation (7), where CR is the average CR of all characters derived by the inventive algorithm, and DA is proportional to the average DA of all characters derived by the inventive algorithm. That is, $$CR = \frac{1}{K}\sum_{k=1}^{K} CR_k$$

$$DA = \eta * \frac{1}{K}\sum_{k=1}^{K} DA_k$$

where η is a reliability control parameter which increases with reliability requirement. This latter recognition performance of test samples (PA) is also displayed in FIG. 15 from which it is clear that the inventive method produces results with higher recognition reliability results than the prior art method of equation (7).

In short, a novel algorithm is disclosed which provides each prototype class of a pattern recognition data base with individually optimized class region and dis-ambiguity thresholds. As a result, recognition reliability is improved over the prior art, where one class region threshold and one dis-ambiguity threshold were used for all classes.

Finally, the discussion is intended to be merely illustrative of the invention. Numerous alternative embodiments may be devised by those having ordinary skill in the art without departing from the spirit and scope of the following claims.

The claimed invention is:

1. In a recognition system utilizing feature value vector matching between unknown input data and model prototype classes in a database having classes $1\leq k\leq K$, a method for decisive recognition, comprising the steps of:

computing a unique class region threshold $CR_k$ for each $k^{th}$ class, computing a unique dis-ambiguity threshold $DA_k$ for each $k^{th}$ class, receiving an input pattern to be recognized, determining a feature value vector x for said input pattern, determining a nearest class M and a second nearest class S to said input pattern, deciding whether said input pattern should be decisively recognized or rejected in accordance with a class region threshold $CR_M$ and a dis-ambiguity threshold $DA_M$ for said nearest class M, wherein the decision being based on the following equation:

$$\text{class\_of}(x) = \begin{cases} M, & \text{when } D(x, r_\partial) = \min_{7=n}^{\overline{7}} D(x, r_7) \\ & \text{and } D(x, r_\partial) < CR_\partial \\ & \text{and } D(x, r_h) - D(x, r_\partial) > DA_\partial; \\ \text{rejected}, & \text{otherwise} \end{cases}$$

where

D denotes a distance function, $r_M$ denotes the matching prototype feature value vector of the nearest class M, $r_k$ denotes a prototype feature value vector class k, $r_S$ denotes the matching prototype feature value vector of the second nearest class S, $CR_M$ denotes the class region threshold for the nearest class M, and $DA_M$ denotes the dis-ambiguity threshold for the nearest class M.

2. The method of claim 1 wherein said steps of computing thresholds $CR_k$ and $DA_k$ comprise setting a cost function E of all said input patterns to be:

$E$ = the total sample number of the reject-from-right group + caused by situation 1 the total sample number of the reject-from-right group + caused by situation 2 the total sample number of the reject-from-wrong group + caused by situation 1 the total sample number of the reject-from-wrong group + caused by situation 2

$\alpha *$ the total sample number of the misrecognized patterns where situation 1 denotes: $D(x, r_M) > CR_M$, and
situation 2 denotes: $D(x, r_M) < CR_M$ and $D(x, r_S) - D(x, r_M) < DA_M$, and $\alpha$ is a cost factor of an incorrect decision.

3. The method of claim 2 wherein said cost function E is expressed in mathematical terms as:

$$E(x) = \left[ \frac{1}{1+e^{\frac{CR_I-O_I}{A}}} + \frac{1}{1+e^{\frac{O_I-CR_I}{A}}} * \frac{1}{1+e^{\frac{(O_S-O_I)-DA_I}{A}}} \right] * \quad (13)$$

-continued $$e^{\frac{O_M-O_I}{A}} + \left[ \frac{1}{1+e^{\frac{CR_M-O_M}{A}}} + \right.$$
$$\frac{1}{1+e^{\frac{O_M-CR_M}{A}}} * \frac{1}{1+e^{\frac{(O_S-O_M)-DA_M}{A}}} \Bigg] * \left(1 - e^{\frac{O_M-O_I}{A}}\right) +$$
$$\alpha * \frac{1}{1+e^{\frac{O_M-CR_M}{A}}} * \frac{1}{1+e^{\frac{DA_M-(O_S-O_M)}{A}}} * \left(1 - e^{\frac{O_M-O_I}{A}}\right)$$

where I denotes the ground-truth class of said feature value vector x $O_k = D(x, r_k)$, and A is a monotonically decreasing function.

4. The method of claim 3 wherein said steps in claim 1 of computing thresholds $CR_k$ and $DA_k$ further comprise minimizing said cost function $E(x)$ to derive optimum values for said thresholds $CR_k$ and $DA_k$, according to the following equation:

$$\frac{\partial E(x)}{\partial CR_k} \approx \begin{cases} [f*(f-1)+g(1-g)*h]*e^{\frac{O_M-O_I}{A}}, & \text{when } k=I; \\ [m*(m-1)+p*(1-p)*r]\left(1-e^{\frac{O_M-O_I}{A}}\right)+ \\ \alpha*p*(1-p)*k*\left(1-e^{\frac{O_M-O_I}{A}}\right), & \text{when } k=M \text{ and } I \neq M; \\ 0, & \text{otherwise} \end{cases} \quad (20)$$

and, $$\frac{\partial E(x)}{\partial DA_k} \approx \begin{cases} g*h*(h-1)*e^{\frac{O_M-O_I}{A}}, & \text{when } k=I; \\ [p*r*(r-1)+\alpha*p*k*(1-k)]\left(1-e^{\frac{O_M-O_I}{A}}\right), & \text{when } k=M \text{ and } I \neq M; \\ 0, & \text{otherwise} \end{cases} \quad (21)$$

where:

$$f = \frac{1}{1+e^{\frac{CR_I-O_I}{A}}},$$

$$g = \frac{1}{1+e^{\frac{O_I-CR_I}{A}}},$$

$$h = \frac{1}{1+e^{\frac{(O_S-O_I)-DA_I}{A}}},$$

$$m = \frac{1}{1+e^{\frac{CR_M-O_M}{A}}},$$

$$p = \frac{1}{1+e^{\frac{O_M-CR_M}{A}}},$$

$$r = \frac{1}{1+e^{\frac{(O_S-O_M)-DA_M}{A}}},$$

$$s = \frac{1}{1+e^{\frac{DA_M-(O_S-O_M)}{A}}}.$$

5. The method of claim 4 wherein said thresholds $CR_k$ and $DA_k$ are updated in accordance with the following iterative procedure:

(a) establishing a monotonically decreasing function value A, (b) initializing values of said thresholds $CR_k$ and $DA_k$ according to:

$$CR_k = 1.5 * \frac{\sum_{i=1}^{N_k} D(x_i^k, r_{iM})}{N_k}$$

$$DA_k = 0.5 * \frac{\sum_{i=1}^{N_k} (D(x_i^k, r_{iS}) - D(x_i^k, r_{iM}))}{N_k}$$

where:

$N_k$ is the total training sample number of class k
$x_i^k$ is the ith training feature vector of class k
$r_{iM}$ is the closest prototype feature vector of class x
$r_{iS}$ is the second closest prototype feature vector to x (c) establishing a cost termination threshold and a maximum iteration number, (d) for each input pattern sample:
  (d1) computing all distance values $D_k = D(x, r_k)$,
  (d2) identifying the nearest class M corresponding to distance $D_M = \min_{1 \leq j \leq K} D_k$,
  (d3) identifying the second nearest class S corresponding to distance $D_S = \min_{k=1, k \neq M} D_k$,
  (d4) computing the accumulated cost according to said cost function E of said equation (13), and
  (d5) updating said thresholds $CR_k$ and $DA_k$ according to said equation (20), and (e) if said accumulated cost is greater than said cost termination threshold or said number of iterations is less than said maximum iteration number reducing A and repeating steps (d) and (d1)–(d5).

6. The method of claim 3 wherein a recognition is evaluated as right or wrong according to the following equation:

$$e^{\frac{O_M - O_l}{A}}.$$

7. The method of claim 3 wherein said situation 1 rejection is evaluated as right or wrong according to the following equation:

$$\frac{1}{1+e^{\frac{CR_M - O_M}{A}}} = \begin{cases} 1, \text{ when } CR_M < O_M; & \text{(reject)} \\ 0, \text{ otherwise.} & \text{(pass)} \end{cases}$$

8. The method of claim 3 wherein said situation 2 rejection is evaluated as right or wrong according to the following equation:

$$\frac{1}{1+e^{\frac{O_M - CR_M}{A}}} * \frac{1}{1+e^{\frac{(O_S - O_M) - DA_M}{A}}} = \begin{cases} 1, \text{ when } CR_M \geq O_M \text{ and } (O_S - O_M) < DA_M; & \text{(reject)} \\ 0, \text{ otherwise.} & \text{(pass)} \end{cases}$$

9. A character recognition system for recognizing an input pattern as one of a predetermined set of model characters that are organized into K classes comprising:

a memory for storing unique class region threshold $CR_k$ for each $k^{th}$ class, where $1 \leq k \leq K$ and a unique dis-ambiguity threshold $DA_k$ for each $k^{th}$ class, a character input device for recieving an input pattern to be recognized, and a processor for determining a feature value vector x for said input pattern, for determining a nearest class M and a second nearest class S to said input pattern, and for deciding whether said input pattern should be decisively recognized or rejected in accordance with a class region threshold $CM_M$ and a dis-ambiguity threshold $DA_M$ for said nearest class M, wherein the decision being based on the following equation:

$$\text{class\_of}(x) = \begin{cases} M, & \text{when } D(x, r_\partial) = \min_{7=n}^{\mp} D(x, r_7) \\ & \text{and } D(x, r_\partial) < CR_\partial \\ & \text{and } D(x, r_h) - D(x, r_\partial) > DA_\partial; \\ \text{rejected,} & \text{otherwise} \end{cases}$$

where

D denotes a distance function, $r_M$ denotes the matching prototype feature value vector of the nearest class M, $r_k$ denotes a prototype feature value vector of a class k, $r_S$ denotes the matching prototype feature value vector of the second nearest class S, $CR_M$ denotes the class region threshold for the nearest class M, and $DA_M$ denotes the dis-ambiguity threshold for the nearest class M.

* * * * *